(12) United States Patent
Vickers et al.

(10) Patent No.: US 6,186,731 B1
(45) Date of Patent: Feb. 13, 2001

(54) REMOVABLE FEEDGATE

(75) Inventors: Robert V. Vickers, Chagrin Falls; E. Kent Daniels, Jr., Shaker Heights, both of OH (US)

(73) Assignee: The Louis Berkman Company, Steubenville, OH (US)

(*) Notice: Under 35 U.S.C. 154(b), the term of this patent shall be extended for 0 days.

(21) Appl. No.: 09/241,665

(22) Filed: Feb. 1, 1999

(51) Int. Cl.⁷ .......................................... B60P 1/36
(52) U.S. Cl. .................... 414/519; 414/502; 414/528; 239/657; 239/672; 239/676; 222/415; 298/23 R
(58) Field of Search ..................... 239/676, 664, 239/672, 657; 222/290, 477, 481, 502, 508, 516, 537, 556, 548, 415, 505; 414/502, 528, 414, 519, 520; 298/23 R (56) References Cited

U.S. PATENT DOCUMENTS

| 2,969,987 | 1/1961 | De Biasi . |
|---|---|---|
| 3,693,890 | 9/1972 | Torrey . |
| 3,790,090 | 2/1974 | Lorenc et al. . |
| 4,886,214 | 12/1989 | Musso, Jr. et al. . |
| 5,397,172 | 3/1995 | Musso, Jr. et al. . |
| 5,437,499 | * 8/1995 | Musso .............................. 414/528 X |
| 5,823,724 | 10/1998 | Hagemeyer et al. . |

* cited by examiner

*Primary Examiner*—Frank E. Werner
(74) *Attorney, Agent, or Firm*—Vickers, Daniels & Young (57) ABSTRACT

The dump body of a dump truck includes a tailgate having an opening through which material in the receptacle can be dispensed by an endless conveyor in the dump body, and a feedgate for adjusting the rate of discharge is removably mounted on one of the tailgate and the bottom of the dump body and has a passageway through which the conveyor belt extends and a door displaceable toward and away from the conveyor to adjust the size of the passageway and thus the rate of material discharge when the conveyor is in operation.

4 Claims, 12 Drawing Sheets

REMOVABLE FEEDGATE

BACKGROUND OF THE INVENTION

The present invention relates to the art of trucks and, more particularly, to improvements in dump trucks of the type including an integrated spreader system for conveying material through a tailgate opening while facilitating the hauling of long items or the hauling and/or dumping of material without interference from auxiliary structures carried by the truck for use in conjunction with the integrated spreader system.

Co-pending Application Ser. No. 677,139 filed Jul. 9, 1996, now U.S. Pat. No. 5,890,867 and U.S. Pat. No. 5,823,734 issued Oct. 20, 1998 are incorporated herein by reference to provide background information with respect to one type of vehicle to which the improvements according to the present invention are applicable.

Trucks, such as dump trucks, have been used heretofore to convey materials such as salt, dirt, gravel, and the like for the purposes of spreading such materials onto road surfaces to improve the traction of vehicles traveling thereon during hazardous driving conditions. Dump trucks have also been used to carry and dispense asphalt on road surfaces for repair and maintenance purposes. Materials of the foregoing nature are commonly dispensed from the truck by tilting the dump body so that the materials flow therefrom by gravity and/or by conveying the materials within the dump body out through an opening in the rear wall or tailgate thereof. Dump trucks with such integrated conveyor systems are shown, for example, in U.S. Pat. No. 5,823,734 and in U.S. Pat. Nos. 4,886,214 to Musso, et al. and 5,397,172 to Musso, et al. In this respect, each of these patents discloses a dump truck in which the dump body or material receptacle is provided with an endless conveyor for conveying materials in the dump body to an adjustable feedgate mounted within an opening in the tailgate of the dump body for selective positioning relative to the conveyor to control the dispensing of materials from the dump body. When the truck is not being used to achieve controlled discharge of granular material such as salt, it is desirable that the truck be capable of an alternate use or uses so as to preclude its being idle. Accordingly, the feedgate arrangements in the foregoing patents are mounted on the tailgate of the dump truck and associated therewith such that the tailgate can be opened to provide for the dumping of materials from the dump body by elevating the latter and/or the hauling of elongated objects such as trees, lumber, pipes and the like in a manner which minimizes interference between the materials being hauled and the feedgate apparatus. As will be apparent from the foregoing patents, if the feedgate apparatus is mounted on a tailgate which is pivotal about a horizontal axis at the upper end of the dump body, granular materials and the like in the dump body flowing through the open rear end thereof are likely to have abrasive contact with the feedgate apparatus. Similarly, if the feedgate apparatus is mounted on a tailgate which is pivotal about a horizontal axis at the lower end of the dump body, the feedgate apparatus has to be displaced to a position relative to the tailgate which minimizes contact between long materials being hauled and the feedgate apparatus. Moreover, if the dump truck is to be used for dumping granular materials other than through the use of the feedgate apparatus, it is difficult to position the feedgate apparatus relative to the tailgate so as to preclude abrasive contact of the material being dumped with component parts of the feedgate apparatus. Moreover, the movement of material across the tailgate and the feedgate apparatus results in problems of jamming of the component parts thereof and damage thereto by the abrasive contact of material therewith as well as damage resulting from efforts to move the component parts when they are jammed. All of these problems result in increased maintenance time and cost in connection with clearing jams and/or repairing or replacing damaged component parts.

SUMMARY OF THE INVENTION

In accordance with the present invention, feedgate arrangements are provided by which the foregoing and other disadvantages and problems with feedgate assemblies heretofore available are minimized or overcome. More particularly in accordance with the invention, a feedgate is removably mounted on one or the other of the bottom or tailgate of the dump body of a dump truck whereby, during periods of non-use of the feedgate, the latter can be removed and the discharge opening in the tailgate covered so as to provide for use of the dump truck for other purposes without interference from or potential damage to the feedgate components. More particularly in this respect, when the opening in the tailgate is closed such as by a flat plate, the truck can be used for hauling a variety of materials which can be dumped when the tailgate is released for pivotal movement to an open position and, with the feedgate removed, such dumping is achieved without any potential interference from or damaged to the component parts of the feedgate. Moreover, if the tailgate is pivotal relative to the truck bed about the lower edge of the tailgate, the latter can be opened to a flat condition for the hauling of elongated objects such as trees, lumber, pipes, and the like. Again, with the feedgate removed such materials at most engage the cover plate for the opening in the tailgate, thus avoiding potential damage to the component parts of the feedgate. In use, whether mounted on the bottom or tailgate of the dump body of a dump truck, the feedgate is mounted inwardly adjacent the tailgate about the periphery of the discharge opening therethrough and has a wall forwardly of the tailgate having a passageway therethrough receiving a rear portion of the material conveyor in the bottom of the dump receptacle and which passageway is provided with a door for controlling the size thereof and thus the rate of discharge of material through the opening in the tailgate during operation of the conveyor. Mounting and removal of the feedgate assembly from the bottom or tailgate can be achieved through a variety of mounting arrangements which are structurally simple and easy to manipulate so as to minimize the time and effort required to achieve mounting and removal of the feedgate unit. It will be appreciated too that when the feedgate is not in use and is removed from the dump truck and suitably stored it is protected from exposure to adverse weather and other potential damage attendant to having a feedgate arrangement permanently attached to the vehicle.

It is accordingly an outstanding object of the present invention to provide improvements in connection with feedgates associated with conveyor mechanisms in dump trucks for controlling the rate of discharge of materials through an opening in the rear end of the dump receptacle.

A further object is the provision of feedgate arrangements associated with the material receptacle of a dump truck in a manner which optimizes protection against damage to the component parts of the feedgate or interference thereof with materials being hauled by the truck during periods of non-use of the feedgate for controlling the flow rate of material discharge of the truck.

Still another object is the provision of feedgate arrangements for a truck of the foregoing character which optimize use of the truck for hauling and/or dumping a wide variety of materials when the truck is not being used in a manner requiring the feedgate to control the discharge rate of material therefrom.

Yet another object is the provision of feedgate arrangements which are readily mountable on and removable from one of the bottom and tailgate of a dump truck.

Still a further object is the provision of feedgate arrangements of the foregoing character which avoids the maintenance and/or replacement costs heretofore encountered with respect thereto as a result of their being mounted on a dump truck during periods of use of the latter which do not require a feedgate.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Referring now in greater detail to the drawings, wherein the showings are for the purpose of illustrating preferred embodiments of the invention only and not for limiting the invention.

Figure 1:
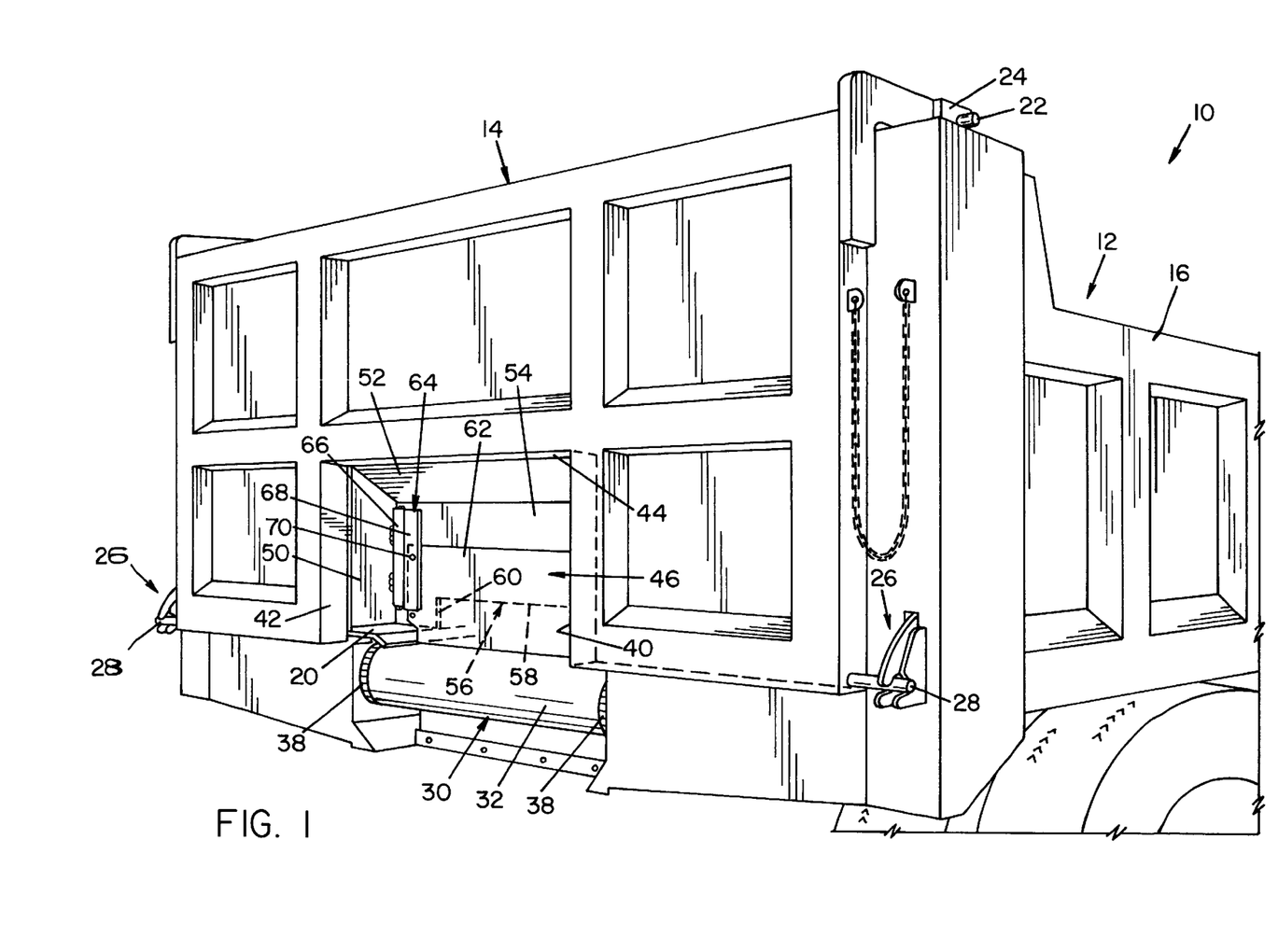
FIG. 1 is a perspective view of the rear portion of the dump body of a dump truck which includes a feedgate arrangement in accordance with the present invention.
Figure 2:
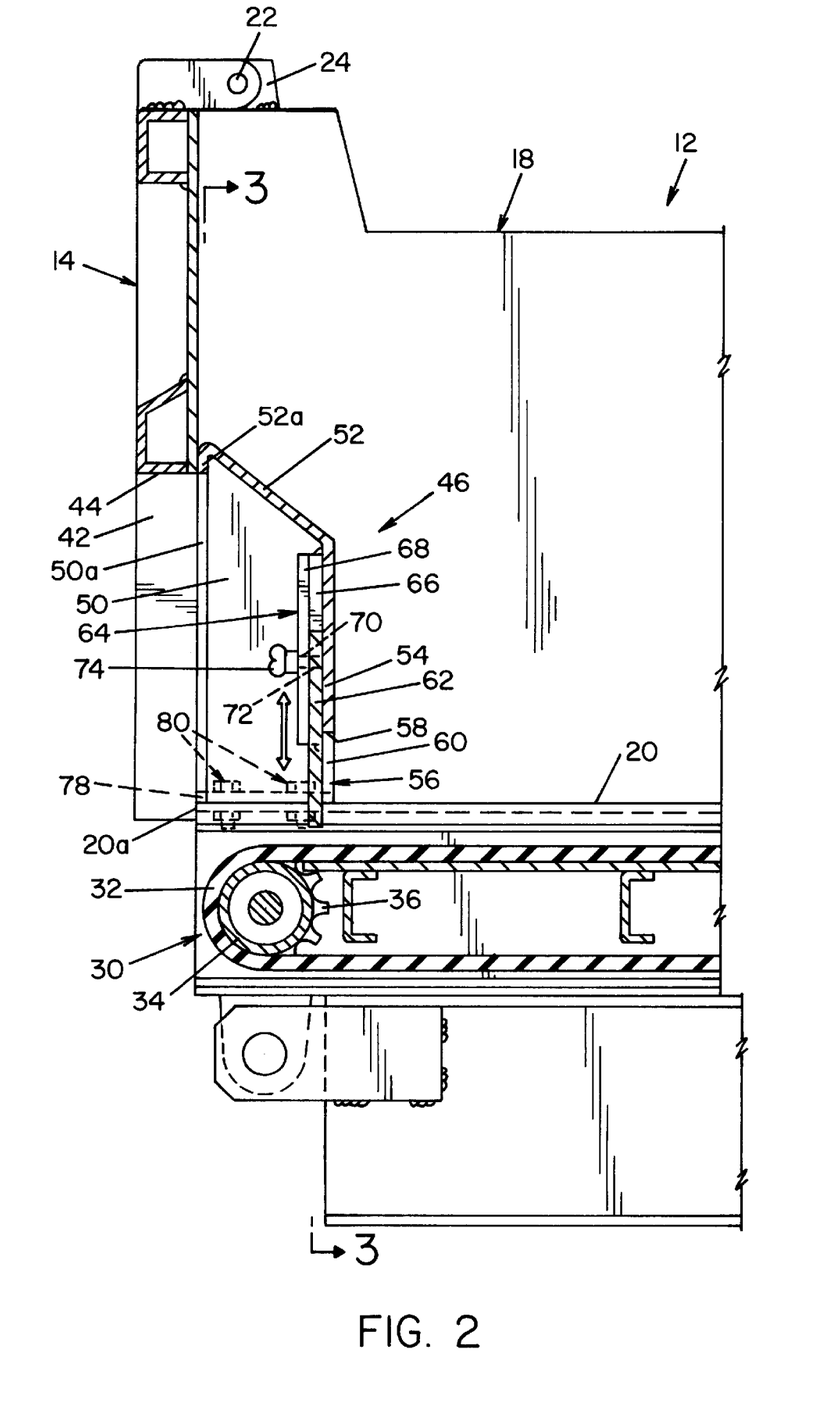
FIG. 2 is a sectional elevation view through the tailgate, conveyor and feedgate of the dump body.
Figure 3:
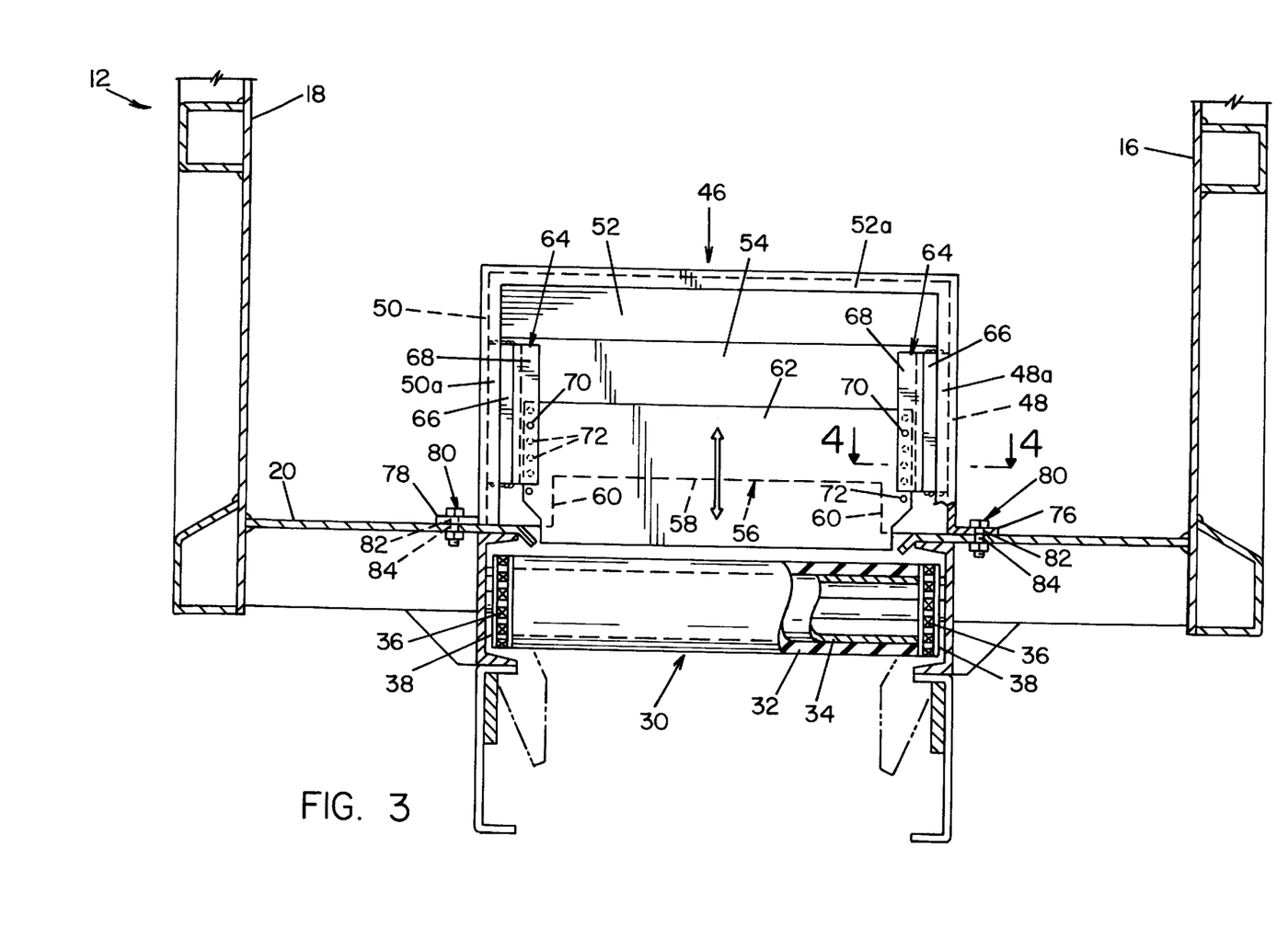
FIG. 3 is a rear end elevation view, partially in section, looking in the direction of line 3—3 in FIG. 2.

FIGS. 1–3 illustrate the rear portion 10 of a dump truck which includes a removable feedgate according to the present invention as will be described in greater hereinafter. As is well known, the rear portion of the dump truck includes a material receptacle or dump body 12 mounted on the truck frame for pivotal displacement about a rear axis from a normal or horizontal position to an inclined position for dumping material from the receptacle. Raising and lowering of the dump body can be achieved by a suitable hydraulic lift arrangement connected between the truck frame and the dump body to raise and lower the latter in a well known manner. Dump body 12 includes a rear end 14, preferably a pivotal tailgate, opposite sides 16 and 18, a bottom 20 and a front end, not shown. While not shown, it will be appreciated that the portions of bottom 20 adjacent sides 16 and 18 can be sloped downwardly and inwardly to facilitate the directing of material in the dump body toward the center thereof. As shown in FIG. 1, tailgate 14 is in a closed position and is pivotally mounted on receptacle 12 by a pair of pivot pins 22 on the tailgate and corresponding pivot bearings 24 on the sides of body 12, only one pair of which pins and bearings is visible in FIG. 1. While not shown, tailgate 14 is also mounted on dump body 12 for pivotal movement about a horizontal axis adjacent the lower end of the tailgate, and reference may be had to co-pending application Ser. No. 677,139, now U.S. Pat. No. 5,980,867 and U.S. Pat. No. 5,823,734 referred to above for details regarding such pivotal mounting. In connection with the tailgate mounting arrangement shown in FIG. 1, the tailgate is maintained in its closed position by tailgate latches 26 which releasably engage latch bars 28 which are attached to the tailgate.

As best seen in FIGS. 1–3, dump body 12 is provided with a conveyor 30 which extends longitudinally between the front and rear ends of the dump body and centrally between sidewalls 16 and 18 thereof. Conveyor 30 is recessed below bottom 20 of the material receptacle and comprises an endless belt 32 trained about sprocket driven front and rear belt drums, as will be appreciated from rear drum 34 shown in FIGS. 2 and 3. Belt 32 can be constructed of a suitable fabric, rubber or other wear resistant material. One or the other of the front and rear belt drums is driven by a suitable power source and, as will be appreciated from FIGS. 2 and 3, the opposite ends of each of the belt drums is provided with a sprocket wheel 36 and the sprocket wheels of the front and rear drums are drivingly interconnected by a corresponding endless sprocket chain 38 trained thereabout. Tailgate 14 has an opening therethrough defined by vertical sides 40 and 42 laterally outwardly adjacent a corresponding one of the sides of conveyor 30 and a top 44 between sides 40 and 42 and spaced above conveyor 30. Accordingly, it will be appreciated that when dump body 12 contains materials, such as salt, and conveyor 30 is driven for the upper run thereof to move toward the rear end of the dump body, the material is discharged from the conveyor through the tailgate opening and, in the case of salt, usually onto a rotary slinger suspended beneath the discharge opening.

In accordance with the present invention, an adjustable feedgate for controlling the discharge flow rate of material on the conveyor is removably mounted on one of the bottom and tailgate of the dump body. In the embodiment illustrated in FIGS. 1–8 of the drawings, the feedgate 46 is inwardly adjacent tailgate 14 and is removably mounted on bottom 20 of body 12 as set forth more fully hereinafter. Feedgate 46 is in the form of a housing having side walls 48 and 50 respectively adjacent sides 40 and 42 of the tailgate opening, and an inclined top wall 52 having an outer end adjacent top edge 44 of the tailgate opening. The top and side walls of housing 46 extend inwardly of tailgate 14 and have inner ends interconnected with a front wall 54 which overlies the rear end of conveyor 30. Wall 54 is provided with a passageway 56 therethrough having a top edge 58 spaced above the upper run of conveyor belt 32 and laterally opposite side edges 60 inwardly adjacent the laterally opposite sides of the conveyor belt. A door 62 is supported on wall 54 for vertical sliding displacement relative thereto by a pair of guide plates 64 each having a leg 66 suitably secured to wall 54 such as by welding and a leg 68 spaced from wall 54 to slidably receive the corresponding marginal edge of door 62. Door 62 provides for adjusting the size passageway 56 through the feedgate and, for varying the size of the passageway, legs 68 of each of the guide plates 64 is provided with a hole 70 therethrough and the marginal side edges of door 54 are each provided with a plurality of holes 72 adapted to be selectively aligned with hole 70 in the corresponding guide plate to receive a pin 74. Accordingly, it will be appreciated that the door is adapted to be releasably held in any one of a number of vertical positions relative to conveyor belt 32. When door 54 is in its lowermost position it engages the upper run of conveyor belt 32 to close the discharge passageway, and when the door is in any one of the positions in which it is spaced above conveyor belt 32, the spacing provides either for a predetermined metered discharge flow rate of material, or coal chuting, which is an unmetered flow, when the conveyor belt is driven in the direction of discharge. More particularly in this respect, when door 54 is spaced up to about six inches from the conveyor belt, a metered discharge is obtained, and when the door is fully open it is spaced eight to nine inches above the conveyor belt and the discharge is not metered and is referred to as coal chuting.

Figure 4:
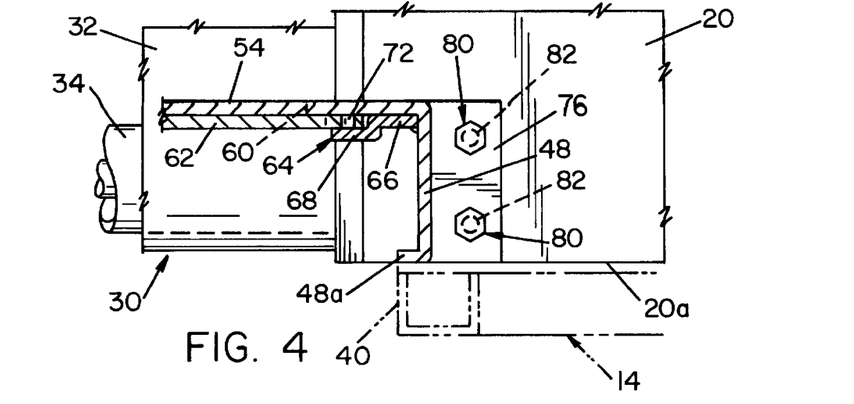
FIG. 4 is a plan view, partially in section, of the mounting arrangement for the feedgate taken along line 4—4 in FIG. 3.

As best seen in FIGS. 2–4, the outer ends of side walls 48 and 50 and top wall 52 of feedgate 46 terminate in inwardly extending flanges 48a, 50a and 52a, respectively, which overlie the inner surface of tailgate 14 about the side and top edges of the tailgate opening so as to minimize leakage of material across the junctures therebetween. The lower ends of side walls 48 and 50 respectively terminate in laterally outwardly extending flanges 76 and 78 which overlie bottom 20 of the dump body and are releasably interconnected therewith by nut and bolt assemblies 80. More particularly in this respect, flanges 76 and 78 are provided with holes 82 therethrough adapted to be aligned with holes 84 in bottom 20 so as to receive the bolt component of the nut and bolt assembly.

It will be appreciated that the nut and bolt fastening arrangement could be defined by bolt shanks welded to flanges 76 and 78 for passage through openings 84 in bottom 20 to receive the nut components. Furthermore, in connection with the provision of aligned openings through the housing flanges and bottom of the dump body, other components such as rotatable locking pins could be used in place of nut and bolt assemblies. When the feedgate is mounted in the receptacle in the foregoing manner, tailgate 14 is maintained in its closed position and, when it is desired to use the truck in a manner which does not require the feedgate, the latter is removed simply by removing the nut and bolt assemblies or other fastener components by which it is mounted on bottom 20 of the dump body.

Figure 5:
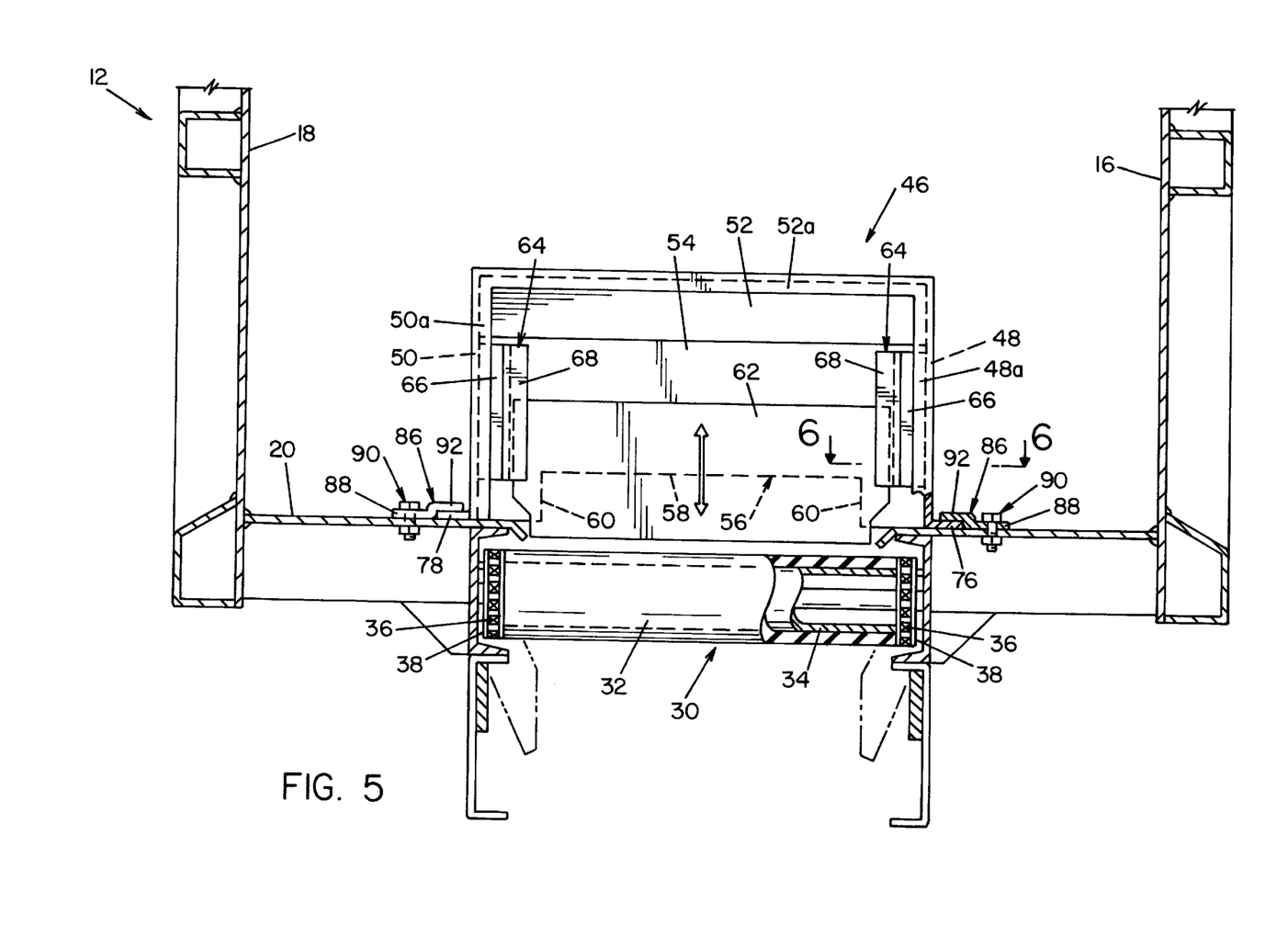
FIG. 5 is a rear elevation view, partially in section, similar to FIG. 3 and illustrating another mounting arrangement for the feedgate.
Figure 6:
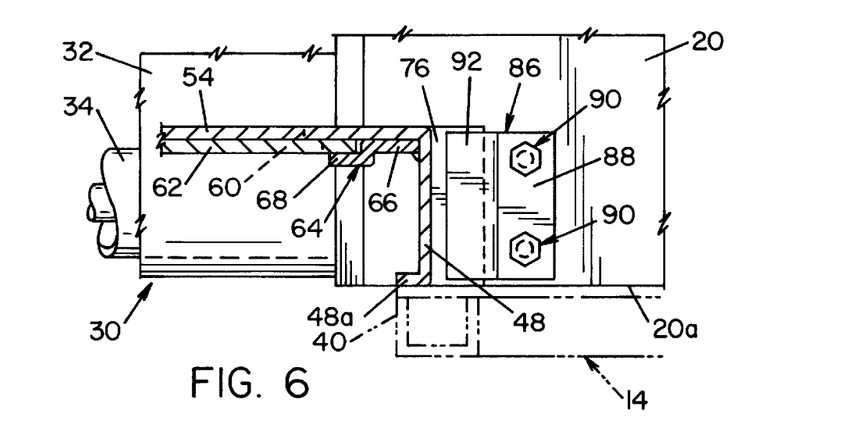
FIG. 6 is a plan view, partially in section, of the mounting arrangement shown in FIG. 5.

FIGS. 5 and 6 illustrate a modification of the mounting arrangement for feedgate 46. The structure of the latter is the same as that described hereinabove in connection with FIGS. 1–4, whereby like numerals appear in FIGS. 5 and 6 for the feedgate housing. In the embodiment of FIGS. 5 and 6, feedgate 46 is removably mounted on bottom 20 of the dump body by clamping plates 86 each having an outer leg 88 overlying bottom 20 and suitably secured thereto such as by a nut and bolt assembly 90, and an inner leg 92 vertically offset from leg 88 to overlie the corresponding one of the housing flanges 76 and 78. When the nut and bolt assemblies 90 are tightened, flanges 76 and 78 are clampingly engaged between bottom 20 and legs 92 of the clamping plates. While one clamping plate is shown associated with each of the flanges 76 and 78 of the feedgate housing, it will be appreciated that two or more clamping plates could be provided for each housing flange. Further, while it is preferred to completely remove the clamping plates in connection with removal of the feedgate from the material receptacle, it will be appreciated that the nut and bolt assemblies could be loosened to facilitate sliding disengagement of flanges 76 and 78 with the clamping plates and then re-tightened and left on the bottom of the dump body. Complete removal is desired so as to provide no obstructions on the bottom of the dump body which could interfere with or be damaged by materials hauled and/or dumped from the dump body during use of the dump truck with the feed gate removed. Still further, it will be appreciated that plates similar to clamping plates 86 could be provided on bottom 20 with legs 92 vertically offset to slidably receive flanges 76 and 78 of the feedgate housing when legs 88 are secured to bottom 20. With this arrangement, the slide or guide plates could be removably mounted on bottom 20 such as by nut and bolt assemblies 90, or legs 88 of the plates could be permanently secured to bottom 20 such as by welding. In connection with such sliding interengagement, it will be appreciated that suitable stops would be provided to limit movement of feedgate housing 46 inwardly of the rear end of dump body 12 so as to assure the abutting engagement shown in FIG. 2 between housing flanges 48a, 50a and 52a and the inner side of tailgate 14.

Figure 7:
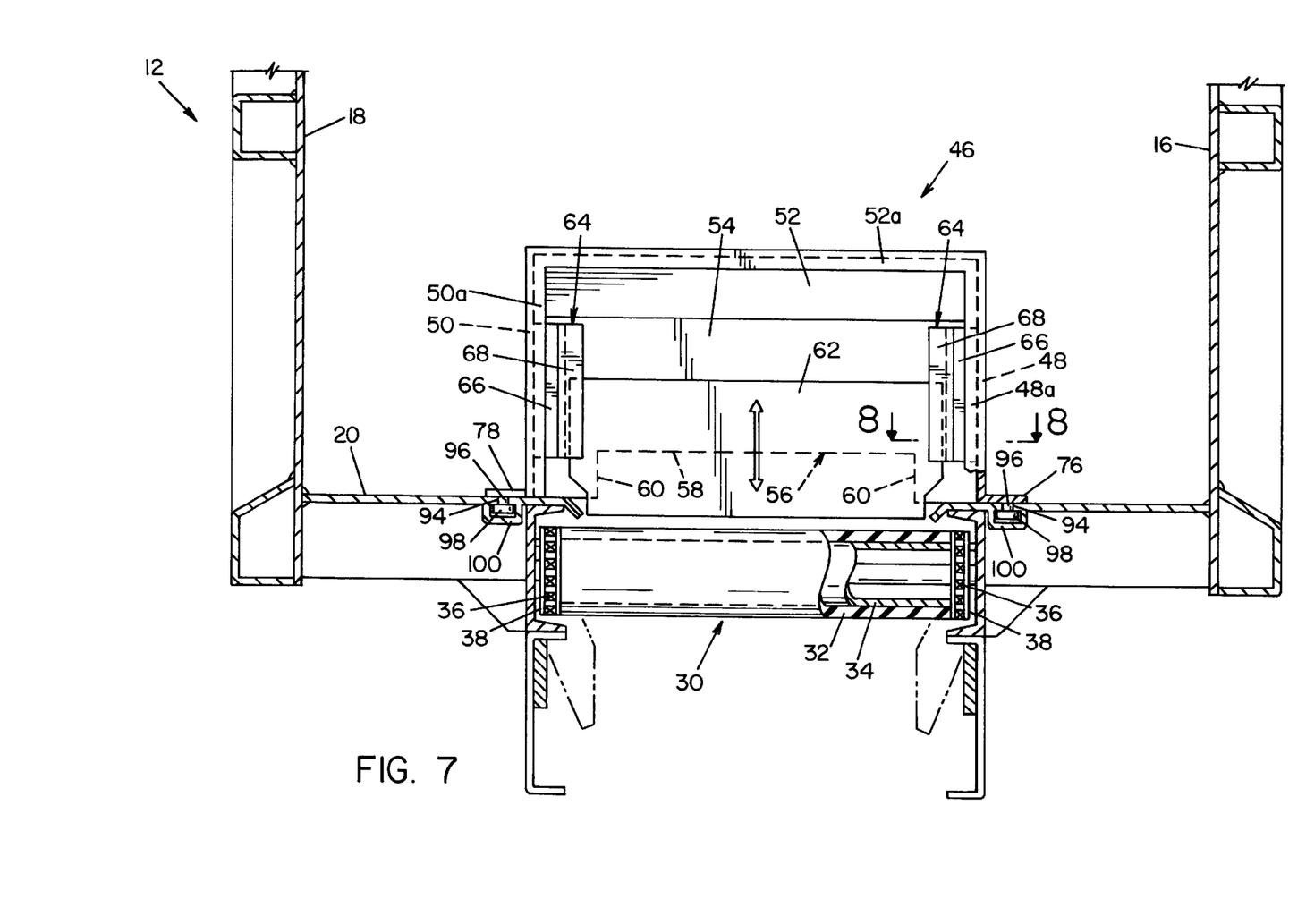
FIG. 7 is a rear end elevation view, partially in section, similar to FIG. 3 and illustrating yet another mounting arrangement for the feedgate.
Figure 8:
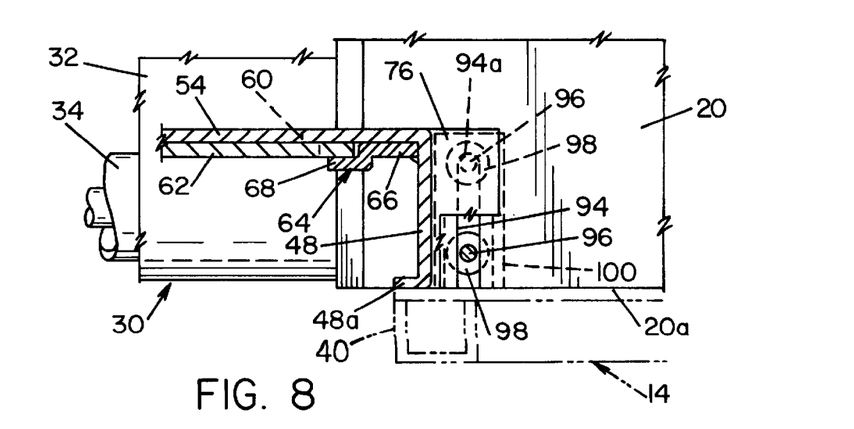
FIG. 8 is a plan view, partially in section, of the mounting arrangement shown in FIG. 7.

FIGS. 7 and 8 illustrate yet another mounting arrangement for feedgate 46. Again, the structure of the feedgate housing is the same as that described hereinabove, whereby like numerals appear in FIGS. 7 and 8 to designate like parts. In this embodiment, bottom 20 of the dump body is provided with longitudinally extending slots 94 extending longitudinally inwardly from the rearward most edge 20a of the bottom and in positions to underlie flanges 76 and 78 of the feedgate housing. Each of the latter flanges is provided with a pair of retaining members comprising a stem 96 extending downwardly through slot 94 and a head 98 for engaging against the underside of bottom 20 to preclude displacement of flanges 76 and 78 and thus feedgate 46 upwardly of bottom 20. Stems 96 are suitably secured to the corresponding flange 76 and 78 such as by welding, and heads 98 are preferably integral with the corresponding stem. Preferably, the underside of bottom 20 is provided with a channel component 100 longitudinally underlying each of the slots 94 and having a width and depth to accommodate the corresponding head 98 and sliding displacement thereof relative to bottom 20. Channels 100 advantageously cover heads 98 and thus protect the latter from damage and exposure to water, salt and the like. The inner ends 94a of slots 94 are spaced from the rearward most edge 20a of bottom 20 so as to be engaged by the forward most stem 96 on each of the flanges 76 and 78 to position feedgate 46 relative to tailgate 14 as shown in FIG. 2.

Figure 9:
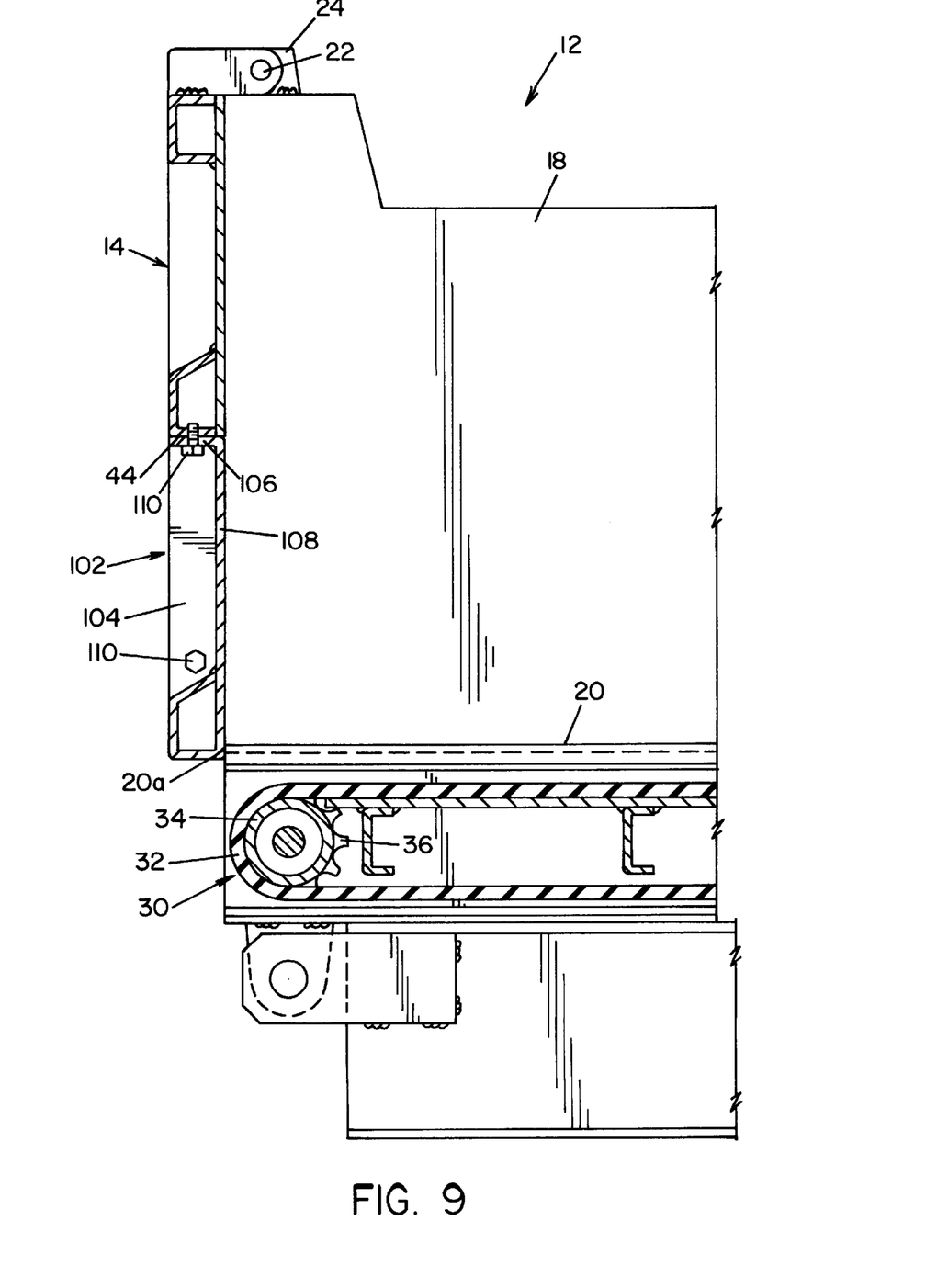
FIG. 9 is a sectional elevation view through the tailgate opening and showing a cover therefor when the feedgate is removed.

When feedgate 46 is removed from bottom 20 of dump body 12, the tailgate opening can be suitably closed, such as by a cover 102 shown in FIG. 9 of the drawing. As will be appreciated from the description of the tailgate opening herein in connection with FIGS. 1–3 of the drawing, cover 102 has a pair of laterally opposite sides 104, only one of which is visible in FIG. 9 and a top 106, which sides and top respectively overlie sides 40 and 42 and top 44 of the tailgate opening when cover 102 is in place. Preferably, the cover further includes an inner wall 108 the inner side of which is coplanar with the inner side of tailgate 14 and extends downwardly so as to engage against rear edge 20a of bottom 20 of the dump body. Cover 102 is removably mounted in the tailgate opening such as by a plurality of threaded fasteners 110 connecting sides 104 and top 106 with the sides and top of the tailgate opening. As will be appreciated from FIG. 9, cover 102 provides a smooth and continuous inner surface on the tailgate which, when the latter is opened by pivotal displacement about an axis at the lower edge thereof provides an extension of bottom 20 which provides for the hauling and/or dumping of material free of any interference between the material and the tailgate.

Figure 10:
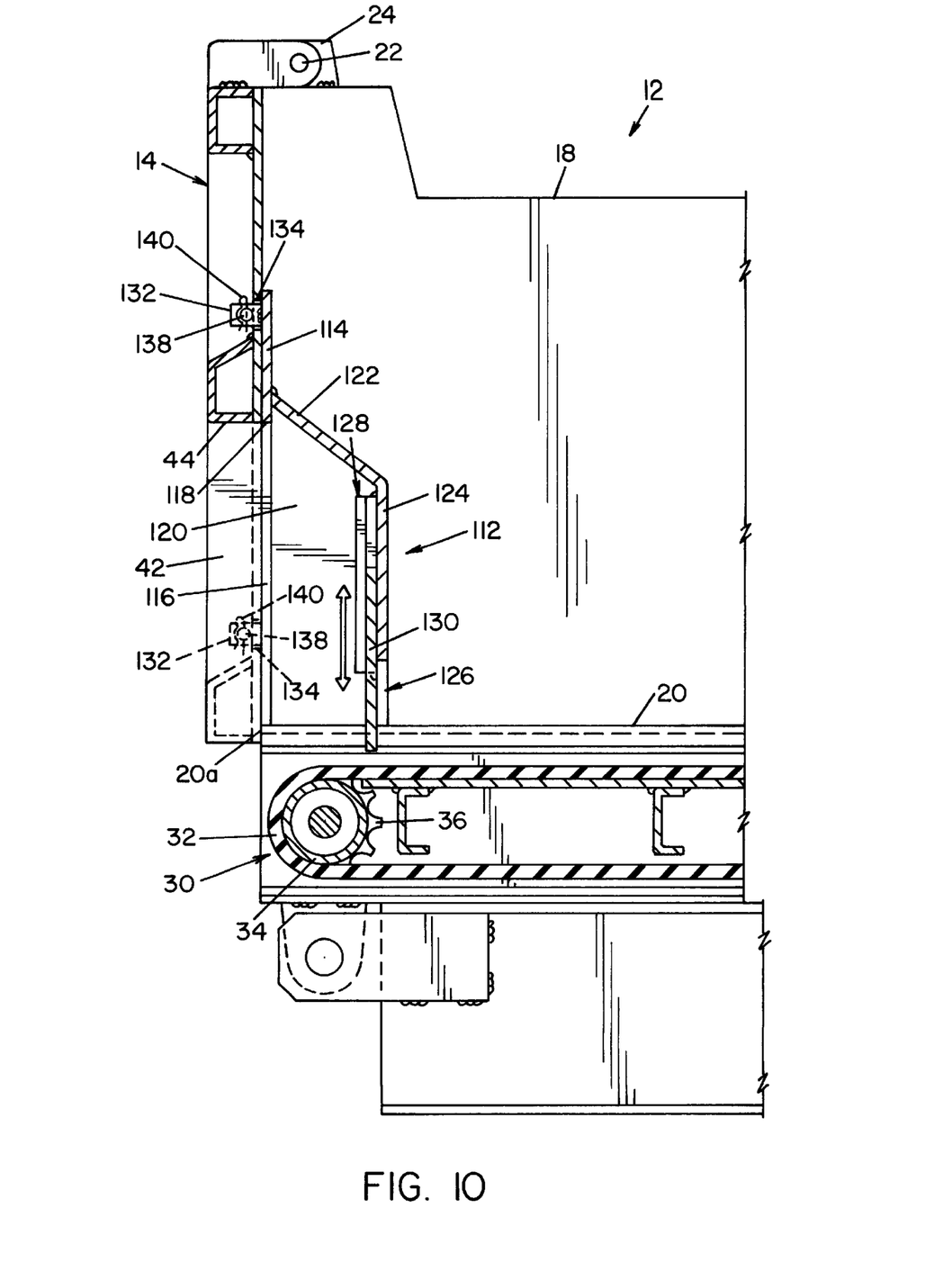
FIG. 10 is a sectional elevation view similar to FIG. 2 and illustrating another embodiment of a feedgate in accordance with the invention.
Figure 11:
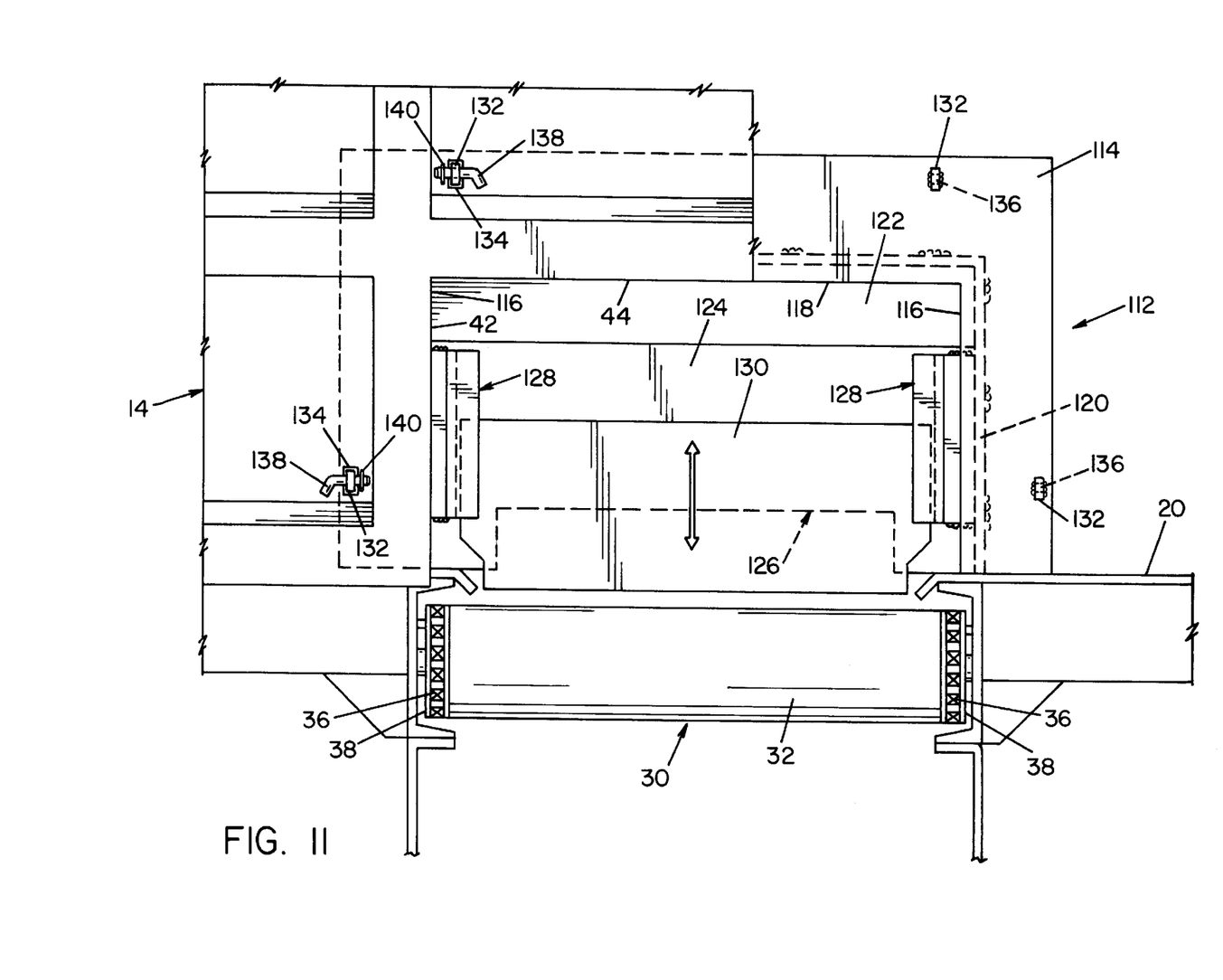
FIG. 11 is a rear end elevation view of the tailgate and feedgate arrangement shown in FIG. 10.

FIGS. 10 and 11 illustrate another embodiment of a removable feedgate assembly according to the present invention. In this embodiment, the feedgate 112 is in the form of a housing which is removably mountable on tailgate 14 of dump body 12 as set forth more fully hereinafter. The feedgate housing comprises a mounting plate 114 overlying the inner side of tailgate 14 and having an opening therethrough including laterally opposite side edges 116 and a top edge 118 which respectively coincide with sides 40 and 42 and top 44 of the tailgate opening. The housing further includes a pair of side walls 120 and an inclined top wall 122 having outer edges secured to mounting plate 114 such as by welding and having inner edges integral with or otherwise interconnected with an inner wall 124 overlying the outer or rear end of conveyor 30. Wall 124 includes a passageway 126 therethrough similar to passageway 56 described hereinabove in connection with feedgate 46, and guide plates 128 similar to guide plates 64 described in connection with FIGS. 1–4 are mounted on wall 124 to slidably support a door 130 which provides for adjusting the sides of passageway 126 in the same manner as door 62 associated with passageway 56. Further, while not shown, it will be appreciated that the vertical position of door 130 relative to conveyor 30 is adjustable in the same manner as described hereinabove in connection with door 62.

Figure 12:
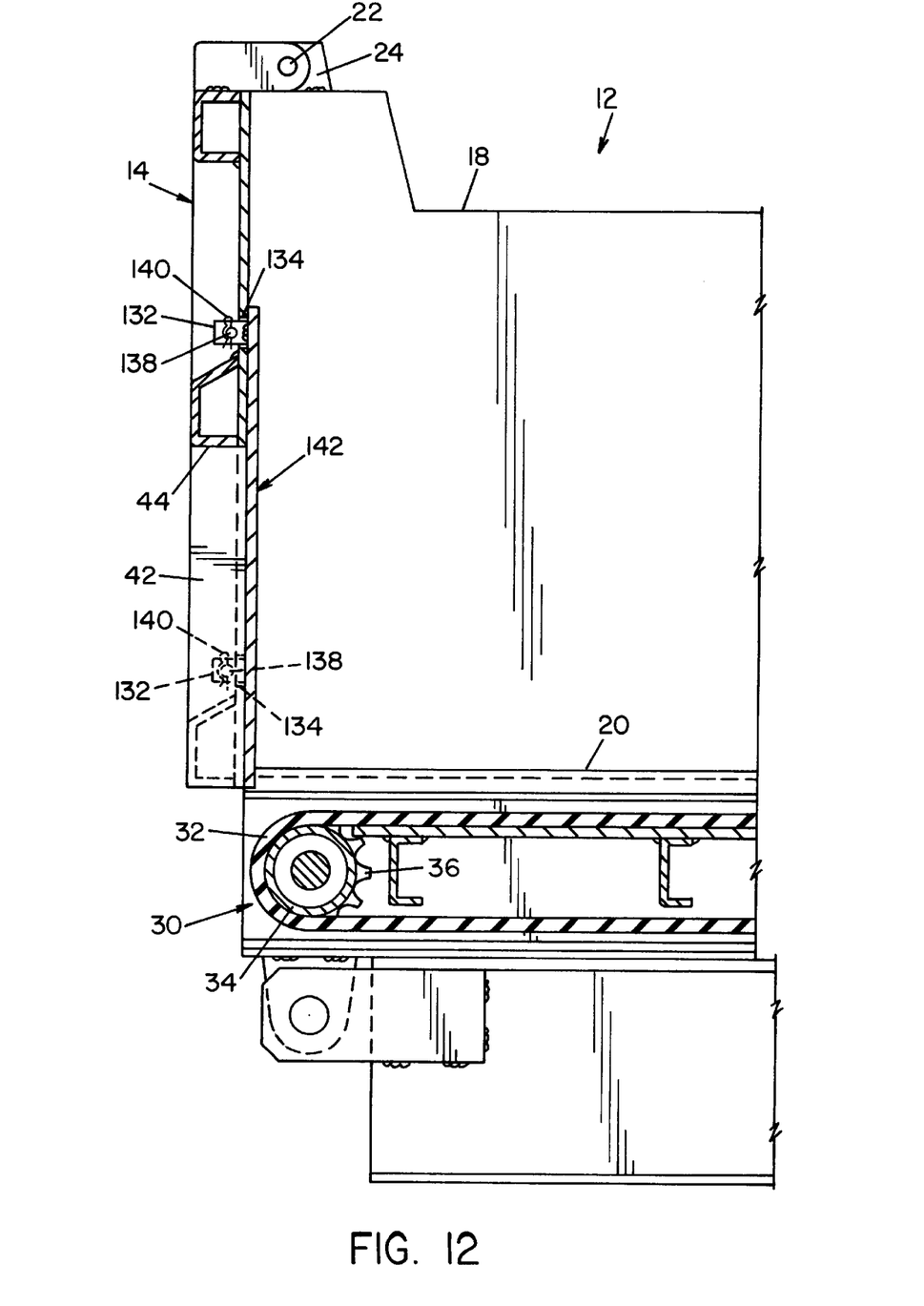
FIG. 12 is a sectional elevation view through the tailgate of the truck showing an arrangement for closing the opening therethrough.

As mentioned above, feedgate 112 is removably mounted on tailgate 14 and, in the embodiment illustrated in FIGS. 10 and 11, such mounting is achieved by providing mounting plate 114 with a plurality of mounting lugs 132 and providing tailgate 14 with corresponding openings 134 through which lugs 132 extend so as to be accessible from the rear or outer side of tailgate 14. Mounting lugs 132 are provided with openings 136 therethrough which receive locking pins 138 by which the mounting plate and thus feedgate 112 are removably mounted on the tailgate. More particularly in this respect, one end of each locking pin is bent relative to the axis thereof and the other end is adapted to receive a removable spring clip 140 which, when mounted on the pin, cooperates with the bent end of the pin to preclude separation of the pin from the mounting lug. Accordingly, removal of the feedgate from the tailgate is readily achieved by removing spring clips 140 from pins 138 and removing the latter from mounting lugs 132 which releases the feedgate for separation from the tailgate. When feedgate 112 is removed, the tailgate opening can be closed using a cover similar to that shown in FIG. 9. Alternatively, as shown in FIG. 12, a flat cover plate 142 dimensioned to close the tailgate opening can be provided with mounting lugs 132 in the positions of the openings 134 in the tailgate, whereby the cover is removably retained on the tailgate by pins 138 and spring clips 140.

Figure 13:
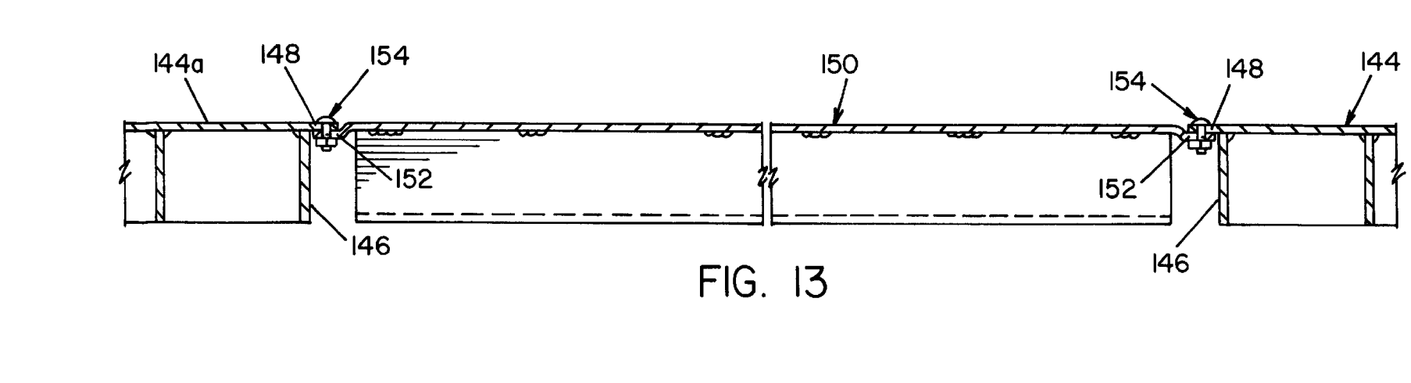
FIG. 13 is a plan view in section showing another mounting arrangement for a cover for the opening in a tailgate.
Figure 14:
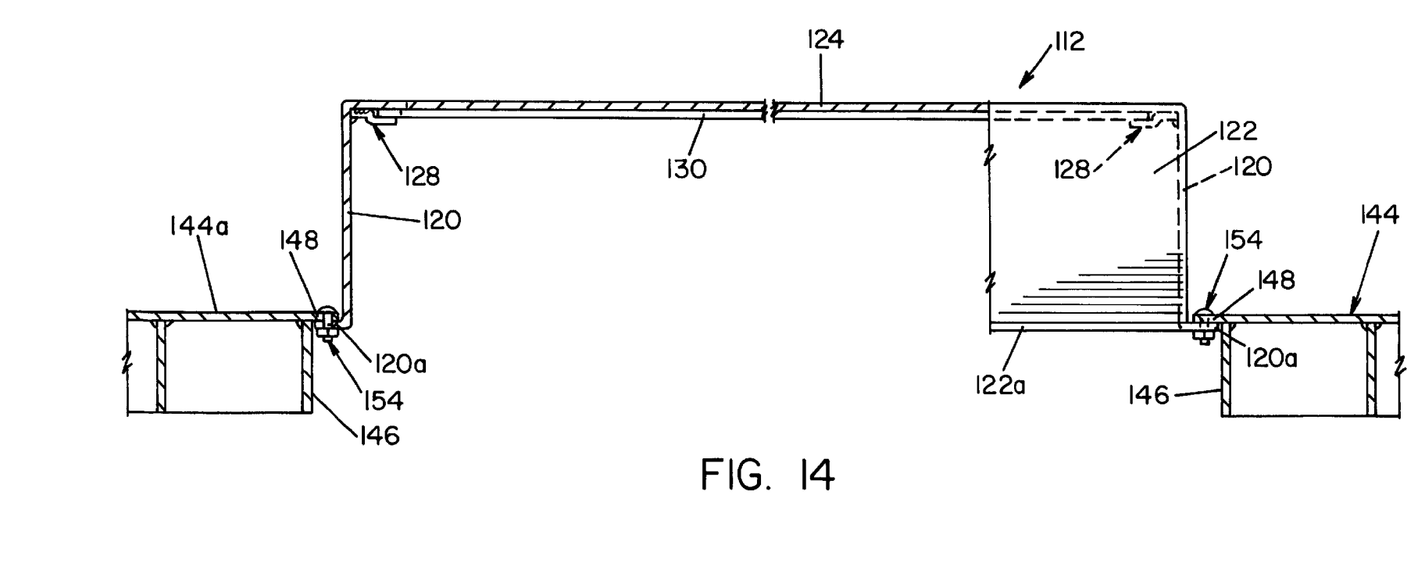
FIG. 14 illustrates a modification of the feedgate shown in FIG. 10 for mounting in the opening of the tailgate shown in FIG. 13.

FIGS. 13 and 14 respectively illustrate a modified tailgate opening and cover structure and a modification of feedgate 112 for mounting in the tailgate opening. More particularly, the tailgate which is designated generally by the numeral 144 has an inner side 144a and an opening therethrough including laterally spaced apart sides 146. The plate which provides inner side 144a of the tailgate extends laterally inwardly of each of the sides 146 of the tailgate opening to provide a mounting flange 148 along each of the opposite sides. As shown in FIG. 13, the tailgate opening can be closed by a cover 150 having mounting flanges 152 underlying flanges 148 on the tailgate and, in this embodiment, the cover is removably mounted on the tailgate by a plurality of nut and bolt assemblies 154 interconnecting flanges 148 and 152. As shown in FIG. 14, the housing of feedgate 112 is modified by removing mounting plate 114 and providing the outer ends of side walls 120 of the housing with laterally outwardly extending mounting flanges 120a. When the feedgate is mounted on the tailgate, the latter flanges underlie mounting flanges 148 on the tailgate, and if feedgate 112 is removably mounted on the tailgate by the nut and bolt assemblies 154.

Figure 15:
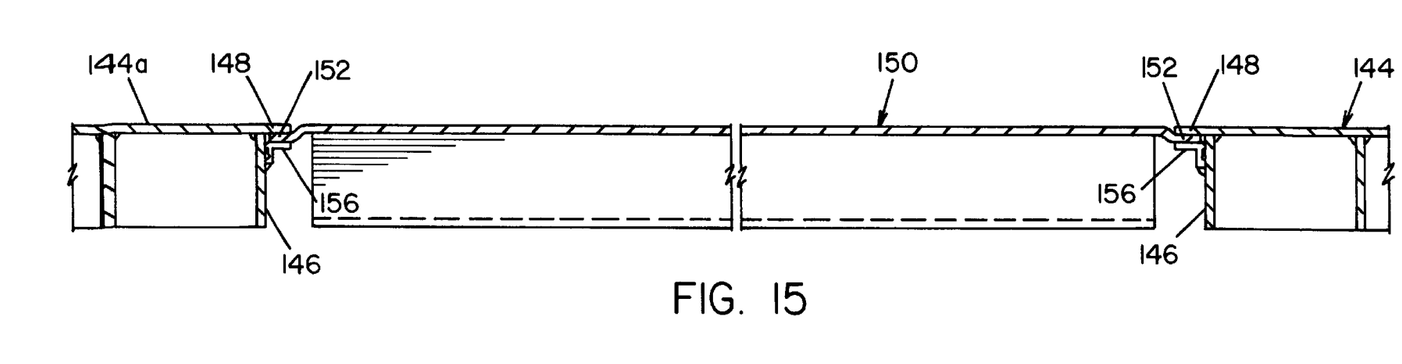
FIG. 15 is a plan view in section showing yet another mounting arrangement for a cover for the opening in the tailgate; and, FIG. 16 illustrates yet a further modification of the feedgate shown in FIG. 10 for mounting in the opening of the tailgate shown in FIG. 15.
Figure 16:
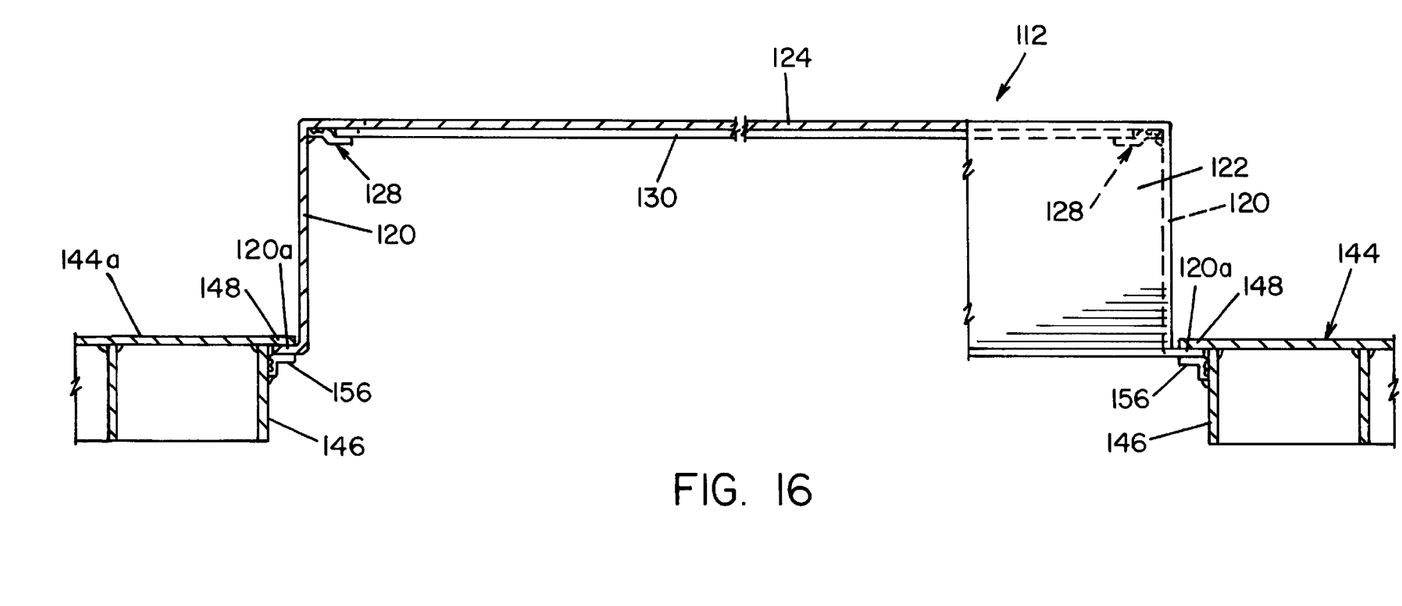

FIGS. 15 and 16 illustrate a modification of tailgate 144 which provides a slidably interengaging mounting arrangement for cover 150 and tailgate 112. In this respect, each of the sides 146 of the tailgate opening are provided with an elongate strip 156 suitably secured thereto such as by welding and which is spaced outwardly from and underlies the corresponding mounting flanges 148 on the tailgate to slidably receive the side edges 152 of cover 150 therebetween, as shown in FIG. 15, or the flanges 120a of the housing of feedgate 112, as shown in FIG. 16.

While considerable emphasis has been placed herein on the structures and structural interrelationships between the component parts of preferred embodiments of the invention, it will be appreciated that other embodiments of the invention can be made and that many changes can be made in the preferred embodiments without departing from the principles of the invention. In this respect in particular, it will be appreciated that many fastening arrangements can be devised for removably mounting the feedgates on one or the other of the bottom and tailgate of the dump body of a dump truck and that the feedgates disclosed herein can be modified for selective mounting on either one of the bottom and tailgate. Furthermore, other feedgate housing structures can be devised and in this respect, for example, the inner walls 54 and 124 of feedgates 46 and 112 can be inclined relative to the conveyor as opposed to being vertical relative thereto. These and other modifications as well as other embodiments will be suggested to those skilled in the art from the disclosures herein, whereby it is to be distinctly understood that the foregoing descriptive matter is to be interpreted merely as illustrative of the invention and not as a limitation.

What is claimed is:

1. In a dump body to be mounted on a truck, said body having a bottom, side walls extending upward from said bottom, a front end and a rear end, a tailgate with a lower opening and pivotally mounted to swing on said body into a position closing said rear end, an endless conveyor at said bottom and extending in the direction between said front end and said rear end for conveying material in said dump body rearwardly for discharge through said opening in said tailgate when said tailgate is in said closed position, a housing with a housing wall inwardly adjacent said tailgate, said housing wall having a passageway over said conveyor and a metering door on said housing wall to control the size of said passageway to control the rate said conveyor moves material through said lower opening of said tailgate, the improvement comprising: said housing being separate from said tailgate and a fastener mechanism releasably fixing said housing to said bottom of said dump body whereby the housing is aligned with the opening in the tailgate only when the tailgate is closed.

2. The improvement as defined in claim 1 wherein said fastener mechanism includes a flange on said housing over said bottom of said dump body and fasteners releasably interengaging said flange onto said bottom.

3. The improvement as defined in claim 2 wherein said fasteners are bolts.

4. The improvement as defined in claim 1 wherein said metering door includes a latch device for holding said door in a variety of positions above said conveyor to control the discharge rate.

* * * * *